United States Patent
Karaoguz et al.

(10) Patent No.: US 8,090,864 B2
(45) Date of Patent: *Jan. 3, 2012

(54) MEDIA EXCHANGE NETWORK SUPPORTING VARYING MEDIA GUIDE BASED ON VIEWING FILTERS

(75) Inventors: Jeyhan Karaoguz, Irvine, CA (US); James D. Bennett, Laguna Beach, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/946,441

(22) Filed: Nov. 15, 2010

(65) Prior Publication Data

US 2011/0066748 A1 Mar. 17, 2011

Related U.S. Application Data

(63) Continuation of application No. 12/185,365, filed on Aug. 4, 2008, now Pat. No. 7,836,196, which is a continuation of application No. 10/672,253, filed on Sep. 26, 2003, now Pat. No. 7,409,457.

(60) Provisional application No. 60/467,867, filed on May 5, 2003, provisional application No. 60/432,472, filed on Dec. 11, 2002, provisional application No. 60/443,894, filed on Jan. 30, 2003.

(51) Int. Cl.
*G06F 15/16* (2006.01)

(52) U.S. Cl. ........ 709/231; 709/229; 709/228; 709/217; 725/105; 725/119; 725/38; 725/98; 725/134; 370/252; 370/338

(58) Field of Classification Search .................. 709/231, 709/229, 228, 217
See application file for complete search history.

(56) References Cited

U.S. PATENT DOCUMENTS

| 6,233,428 | B1 | 5/2001 | Fryer |
| 7,003,795 | B2 | 2/2006 | Allen |
| 7,065,778 | B1 | 6/2006 | Lu |
| 7,409,457 | B2 * | 8/2008 | Karaoguz et al. ............. 709/231 |
| 7,836,196 | B2 * | 11/2010 | Karaoguz et al. ............. 709/231 |
| 2002/0016971 | A1 | 2/2002 | Berezowski |
| 2003/0115585 | A1 | 6/2003 | Barsness |
| 2004/0003040 | A1 | 1/2004 | Beavers |

* cited by examiner

*Primary Examiner* — Jude Jean Gilles

(74) *Attorney, Agent, or Firm* — McAndrews, Held & Malloy, Ltd.

(57) ABSTRACT

Systems having a user interface comprising a filtered view of media available for consumption are disclosed. An embodiment of the present invention may provide a first user with a view that enables consumption of only the available media that matches characteristics of a media filter. The characteristics of the media filter may be specified by a second user, and the second user may define the characteristics of the media filter remotely, via a communication network. The user interface may support separate media filters for each of a number of different users. Filter characteristics such as type of media channel, the language of any dialogue, an industry rating, an overall viewer rating, and the media format may be supported. The media filter characteristics may be applied not only to what is displayed on the user interface, but also the media available for selection via a remote control.

45 Claims, 16 Drawing Sheets

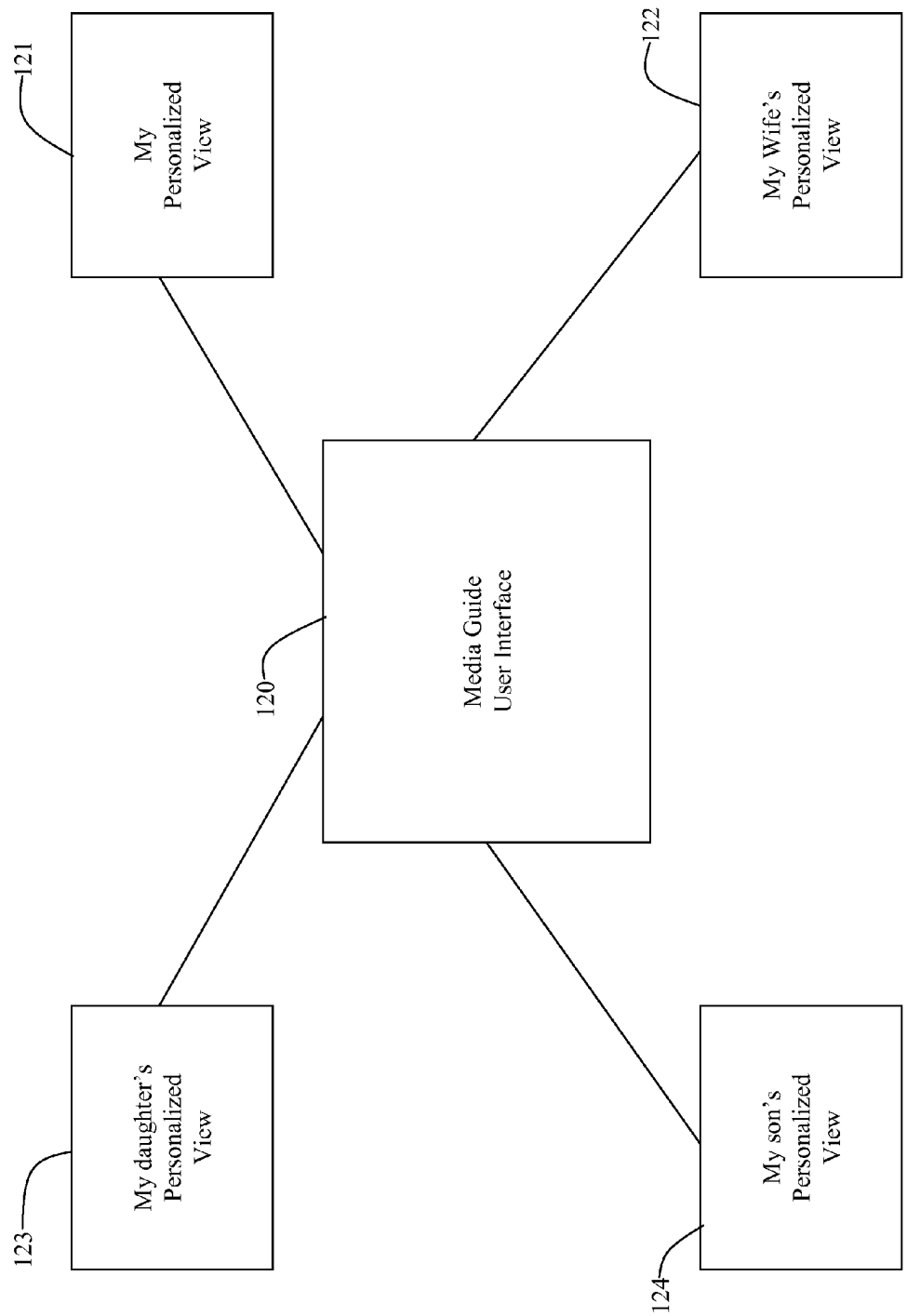

| CHANNEL LINE UP | <<1PM | 2PM | HOUR, DAY ... | 6PM | 7PM>> |
|---|---|---|---|---|---|
| FAMILY VACATIONS | | | | | |
| KID's SPORTS | | | | | |
| ... | | | | | |
| VACATION in ALASKA VIDEO 802 | Normal Estimated Delivery Time: 2 hrs 13 min Cost: 59c (without Queuing) | | | Showing All Day (48 Min), Earliest Order Time: 4:00PM MPEG-2 1.5 Mbps | |
| VACATION in ALASKA VIDEO 803 | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO 804 | Overnight Delivery: Avail. Nxt Morning Cost: 5c (Server Stored) | | | Showing All Day (48 Min), Earliest Order Time: 4:00PM MPEG-2 19 Mbps | |

Fig. 8

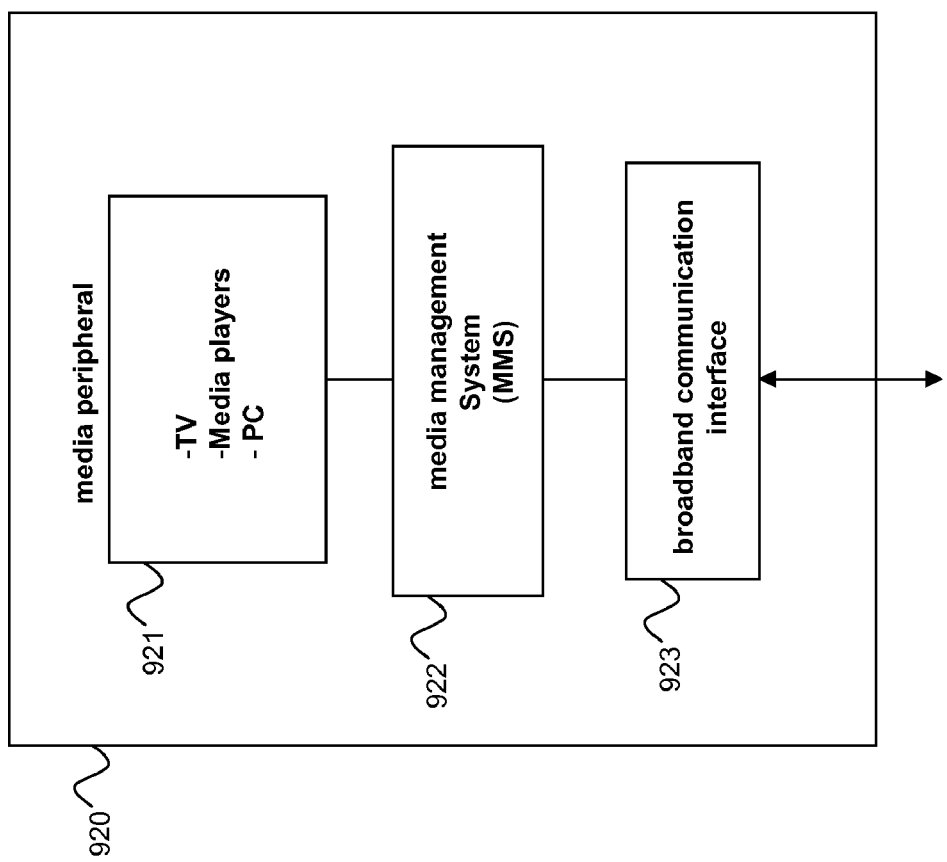

MEDIA EXCHANGE NETWORK SUPPORTING VARYING MEDIA GUIDE BASED ON VIEWING FILTERS

CROSS-REFERENCE TO RELATED APPLICATIONS/INCORPORATION BY REFERENCE

This application is a continuation of U.S. patent application Ser. No. 12/185,365, entitled "MEDIA EXCHANGE NETWORK SUPPORTING VARYING MEDIA GUIDE BASED ON VIEWING FILTERS", filed Aug. 4, 2008, now U.S. Pat. No. 7,836,196, issued Nov. 16, 2010, which is a continuation of U.S. patent application Ser. No. 10/672,253, entitled "MEDIA EXCHANGE NETWORK SUPPORTING VARYING MEDIA GUIDE BASED ON VIEWING FILTERS", filed Sep. 26, 2003, now U.S. Pat. No. 7,409,457, issued Aug. 5, 2008, which makes reference to, claims priority to, and claims the benefit of U.S. Provisional Patent Application 60/467,867, entitled "Media Exchange Network Supporting Varying Media Guide Based On Viewing Filters", filed May 5, 2003, U.S. Provisional Application Ser. No. 60/432,472, entitled "Personal Inter-Home Media Exchange Network", filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of which are hereby incorporated herein by reference, in their entirety.

In addition, the applicants hereby incorporate the complete subject matter herein by reference, in their entirety, of U.S. Provisional Patent Application Ser. No. 60/448,705, entitled "Media Exchange Network With Media Guide Interface", filed Feb. 18, 2003, and U.S. Provisional Patent Application Ser. No. 60/470,263, entitled "Supporting Multiple Users From A Single Location Sharing A Media Processing System Via A Personal Media Guide", filed on May 14, 2003. In addition, this application makes reference to U.S. patent application Ser. No. 10/657,390, entitled "Personal Inter-Home Media Exchange Network", filed Sep. 8, 2003, and U.S. patent application Ser. No. 10/667,267, entitled "Personal Access And Control Of Media Peripherals On A Media Exchange Network", filed Sep. 11, 2003, the complete subject matter of which are hereby incorporated herein by reference, in their entirety.

With respect to the present application, Applicant hereby rescinds any disclaimer of claim scope made in the parent application or any predecessor or related application. The Examiner is advised that any previous disclaimer of claim scope, if any, and the alleged prior art that it was made to allegedly avoid, may need to be revisited. Nor should a disclaimer of claim scope, if any, in the present application be read back into any predecessor or related application.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Currently, the programming received by users of third party media services such as broadcast, direct satellite, or cable television are subject to the control of the media provider, i.e. the broadcaster, or direct satellite or cable service provider. Some of the material made available for viewing may be inappropriate for certain family members, for example young children or teens. Provisions for locking out channels are available on some viewing devices, but these mechanisms support minimal control and lack the flexibility that may be required to meet the needs of the subscriber to the ever expanding choices of media services.

In addition, many service provider systems offer such a large variety of channels of programming that a large portion of those available hold little or no interest for a particular viewer. This may be due to a number of factors including, for example, the subject matter, the age or quality of the media broadcast, the content rating, the time or date of broadcast, the language in which it is distributed, technical aspects of the equipment needed to access the programming, and cost to the subscriber to view the material, to name just a few.

In a situation with multiple viewers, each viewer may have an appropriate set of preferences, privileges, or restrictions that may be different from those of others members of the household. In addition, any given user may have a different set of preferences for different times during the day or week. For example, a user may prefer to have access to industry or business-related information sources before leaving for work, and investment-related information sources upon returning in the evening following the close of financial markets. Weekend media access may focus on entertainment programming or personal information sources from family and friends. Children may be individually restricted to certain educational media sources during the school week, and only during certain hours of the day.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for communicating information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1B is a diagram illustrating an embodiment of a media guide user interface supporting multiple personalized views on the media exchange network of FIG. 1A, in accordance with various aspects of the present invention.

FIG. 8 is an exemplary illustration of a media guide user interface showing several options of a pushed media in accordance with an embodiment of the present invention.

FIG. 9B illustrates an alternative embodiment of a media processing system (MPS) in accordance with various aspects of the present invention.

DETAILED DESCRIPTION OF THE INVENTION

Certain embodiments of the present invention relate to user access to media channels. In particular, certain embodiments of the present invention relate to the management of filters used in the creation of a media guide (a.k.a. "TV channel guide", "TV channel guide look-and-feel", "channel view") user interface on a media processing system in a media exchange network.

Figure 1A:
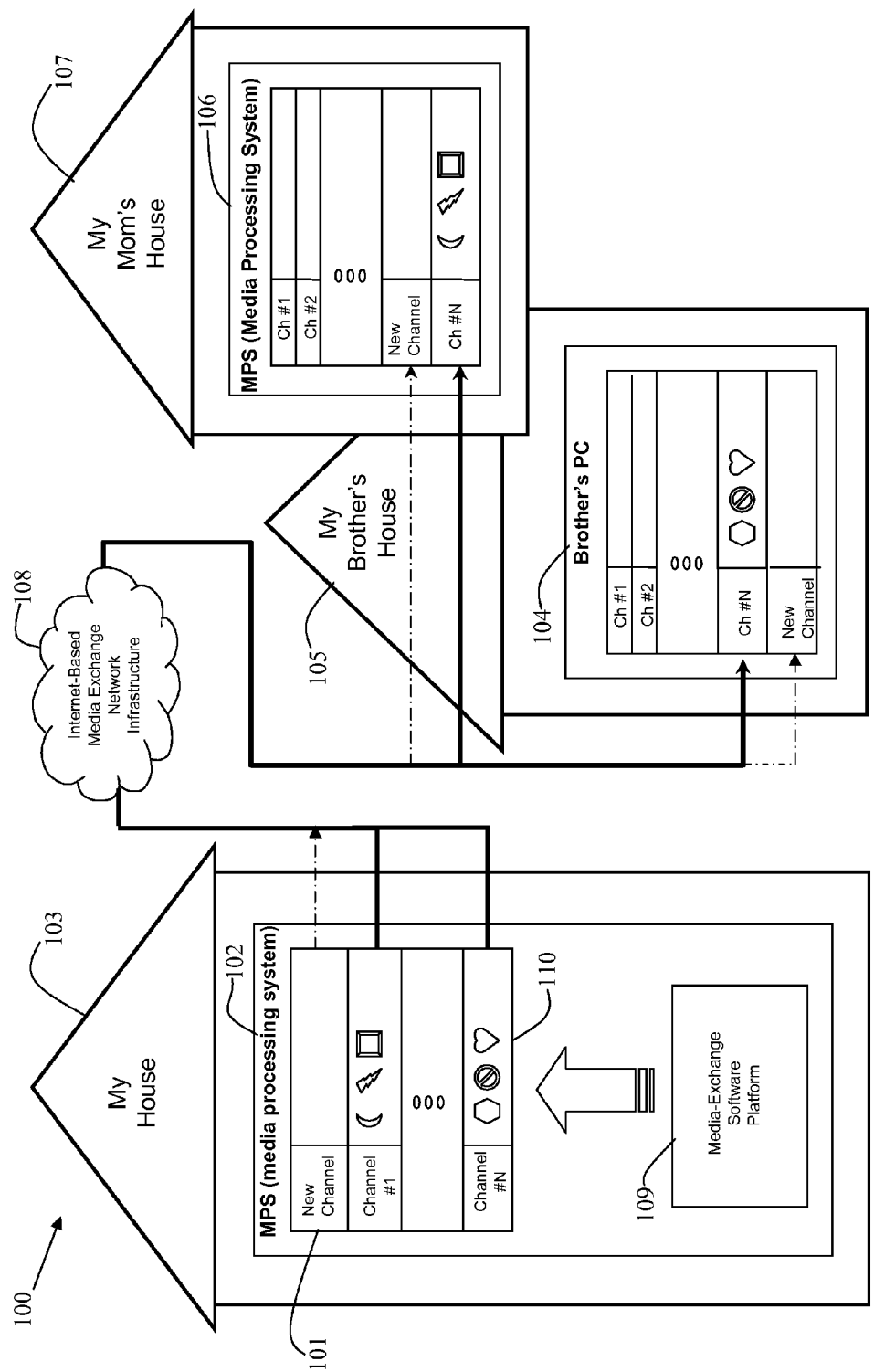
FIG. 1A is a diagram illustrating a first embodiment of a media exchange network supporting supervisory control of a media guide user interface for users at a single location sharing a media processing system on the media exchange network, in accordance with various aspects of the present invention.

FIG. 1A is a diagram illustrating a first embodiment of a media exchange network 100 supporting supervisory control of a media guide user interface 110 for users at a single location 103 sharing a media processing system 102 on the media exchange network 100, in accordance with various aspects of the present invention. Specifically, the media exchange network 100 is a communication network comprising a MPS (media processing system) 102 at "My House" 103, a brother's PC 104 at "My Brother's House" 105, and a MPS 106 at "My Mom's House" 107. Note that the use of labels such as "My House", "My Brother's House", etc., are for illustrative purposes only, and do not represent a limitation of the present invention.

The media exchange network 100 comprises the Internet-based media exchange network infrastructure 108 which connects together the MPS 102, the PC 104, and the MPS 106. In various embodiments of the present invention, the media exchange network infrastructure 108 may comprise, for example, cable infrastructure, a satellite network infrastructure, a digital subscriber line (DSL) infrastructure, an Internet infrastructure, an intranet infrastructure, a wired infrastructure, and a wireless infrastructure, or any combination of the above. Entities within the media exchange network 100 may be identified using a network or protocol address such as, for example, an Internet protocol (IP) address, a media access control (MAC) address, and an electronic serial number (ESN).

The MPS's (102 and 106) may be, for example, enhanced set-top-boxes. The MPS's (102 and 106) may each include a TV screen for viewing and interacting with various user interfaces, media, data, and services that are available on the media exchange network using, for example, a remote control. The PC 104 may include a PC monitor for viewing and interacting with various user interfaces, media, data, and services that are available on the media exchange network using, for example, a keyboard and mouse. The MPS's and PC include functional software to support interaction with the various elements of the media exchange network 100, in accordance with various embodiments of the present invention.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

For example, the MPS 102 comprises a media exchange software (MES) platform 109. The MES platform 109 on the MPS 102 supports personalized views of media channels and set up of new media channels on the media exchange network 100. For example, the MES platform 109 provides a format, displayed on a monitor of the MPS 102, known as a media guide user interface 110 to allow a user to set up a personalized view of the media guide user interface 110 using a remote control. An example media guide user interface is described in U.S. Provisional Patent Application Ser. No. 60/448,705, filed Feb. 18, 2003, the complete subject matter of which is hereby incorporate herein in its entirety. The MES platform 109 also provides the functionality for a user of the MPS 102 to set up a new media channel 101 in his personalized view.

In general, the MPS's 102 and 106 and the PC 104 each include a media exchange software (MES) platform and a networking component for connectivity. The MES platform provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface with a TV channel guide look-and-feel.

FIG. 1B is a diagram illustrating an embodiment of a media guide user interface 120 supporting multiple personalized views on the media exchange network 100 of FIG. 1A, in accordance with various aspects of the present invention. The media guide user interface 120 supports "My personalized view" 121, "My wife's personalized view" 122, My daughter's personalized view" 123, and "My son's personalized view" 124 on the MPS 102 at "My House" 103. It should again be noted that the use labels such as "My House", "My Brother's House", etc., are for illustrative purposes only, and do not represent a limitation of the present invention. Each personalized view or "media guide" may include a unique set of media channels, defined according to the preferences of the user. An example media guide that may be customized for multiple users is described in U.S. Provisional Patent Application Ser. No. 60/470,263, entitled "Supporting Multiple Users From A Single Location Sharing A Media Processing System Via A Personal Media Guide", filed May 14, 2003, the subject matter of which is hereby incorporated herein in its entirety.

Figure 1C:
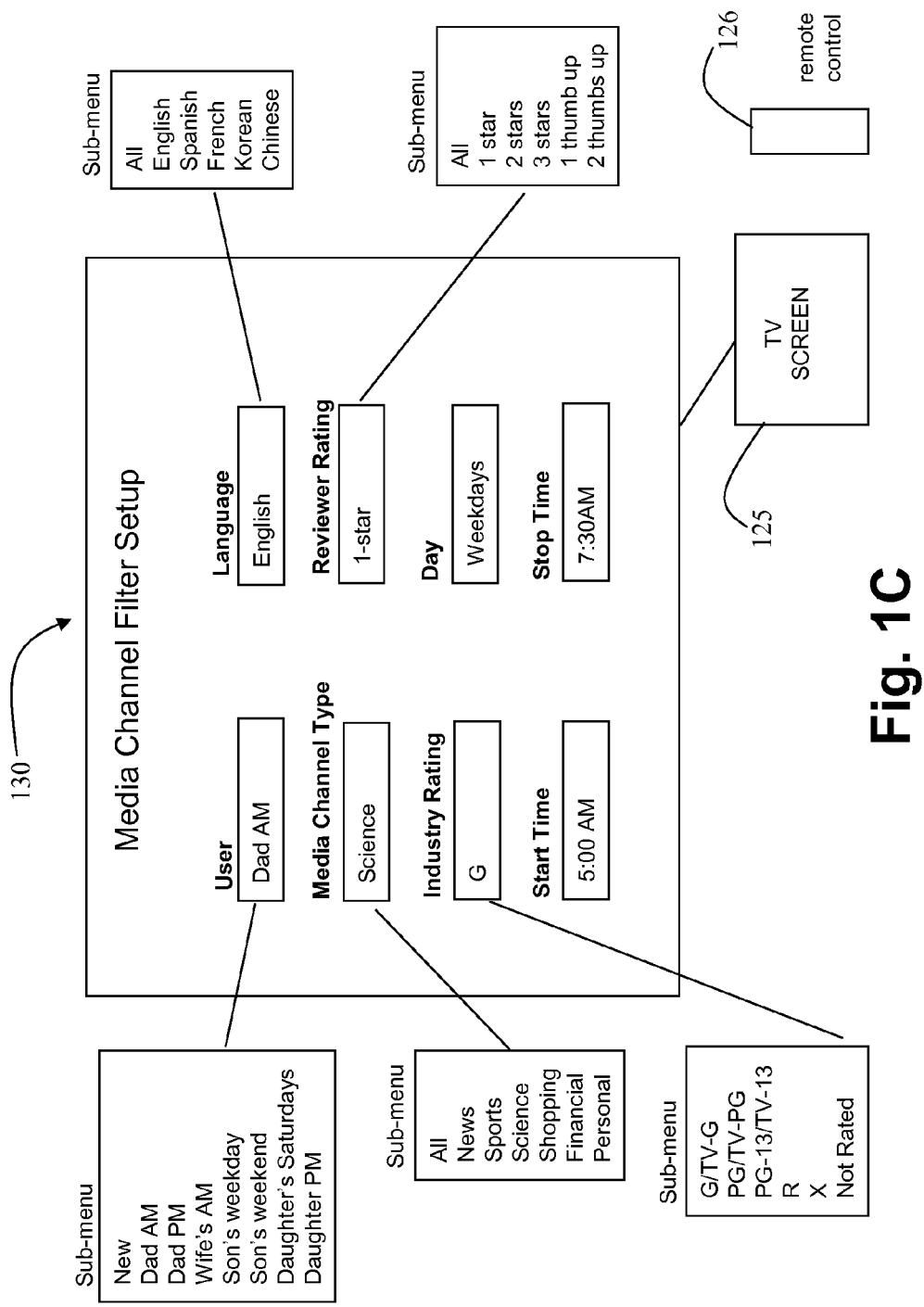
FIG. 1C is a diagram illustrating an embodiment of a setup screen used in configuring a media channel filter in a MPS such as the MPS of FIG. 1A, or a PC, such as the PC of FIG. 1A, in accordance with the present invention.

FIG. 1C is a diagram illustrating an embodiment of a setup screen 130 used in configuring a media channel filter in a MPS such as the MPS 102 of FIG. 1A, or a PC, such as the PC 104 of FIG. 1A, in accordance with the present invention. As described above, each MPS 102 or PC 104 may have a variety of users, and not all of the media channels available via media exchange network 108 of FIG. 1A will be suitable for all users. For this reason, the media exchange network 108 and, in particular, the MPS 102 or the PC 104 may permit designated users to establish filters to control which of the Internet-based or $3^{rd}$ party media channels available via media exchange network 108 are allowed to appear in the personal views, such as "My personalized view" 121, "My wife's personalized view" 122, My daughter's personalized view" 123, and "My son's personalized view" 124, described above.

The diagram of FIG. 1C illustrates a few of the characteristics that may be evaluated by the filtering functionality in an embodiment in accordance with the present invention. Possible filter characteristics include, for example, the type of media channel (e.g., all, science-related, sports-related, shopping, financial information channels, history, cartoons, music, weather, medical, and personal or family channels, etc.), the language of the dialogue (e.g., English, Spanish, French, Korean, Chinese, etc.), any industry rating that may apply (e.g., "Not Rated", "G/TV-G", "PG/TV-PG", "PG-13/TV-13", "R", "X", "Parental Advisory", etc.), an overall reviewer rating (all, "one star", "two stars", "three stars", etc.), mode (black-and-white, colorized, color), video quality (standard or HDTV), format (normal or letterbox), bandwidth, year of release, leading actor/actress or artist, particular words in the title, to name only a few. An embodiment in accordance with the present invention provides filtering capabilities for personal and $3^{rd}$ party media not previously available.

As shown in the embodiment illustrated in FIG. 1C, the authorized user may specify a filter that includes a number of factors in combination, allowing the arrangement of a range of media channel filtering from the simple to the complex. Combinations of characteristics using Boolean relations (e.g., "John Wayne" AND "color" AND year-of-release>1955) may be used to create efficient filters to limit the volume of media channel information about which one is made aware. Although the illustration of FIG. 1C shows an embodiment using only seven characteristics, the present invention is not limited in this regard. An embodiment of the present invention may employ a greater or lesser set, or a completely different complement of factors in performing the filtering function without departing from the spirit of the present invention.

In addition, an embodiment of the present invention may allow the creation of a number of efficient media channel filters for each user. Each of the media channel filters may be active during a different time period. For example, a user of an MPS or a PC, such as the MPS 102 or the PC 104 of FIG. 1A, may have media channel filters that apply to, for example, specific holidays, only during certain vacation periods, a particular time of day, designated days of the week, after or before a certain date or time, etc.

An embodiment in accordance with the present invention may permit an authorized and authenticated user to designate or modify the set of characteristics to be used in filtering the media channels available for a given user of an MPS or a PC, such as the MPS 102 or the PC 104 of FIG. 1A, either directly or remotely. This may be accomplished directly, using the TV screen 125 and remote control 126 that may be connected to the MPS 102. The setup may also be performed directly on a PC, such as PC 104 of FIG. 1A, via the keyboard, mouse, and monitor that may be connected to the PC 104. Media channel filters may be enabled and configured remotely using another MPS, such as MPS 106 of FIG. 1A, via media exchange network 108, or via a remote PC, such as PC 104, via the Internet.

In an embodiment of the present invention, the media channel filtering functionality described above may be applied both during the creation of the media guide showing the current user's personal media channel preferences, and to the media channels accessible via the media channel selection capabilities of remote control 126. In this manner, the contents of the media guide for a user lists only those media channels that meet the criteria defined in the media channel filter for that user, and the user has access only to those media channels, either through a media guide selection on TV screen 125, or via, for example, key presses entered on remote 126.

Figure 1D:
FIG. 1D is a diagram showing the characteristics of the media channel filters in effect in an exemplary embodiment in accordance with the present invention.

FIG. 1D is a diagram showing the characteristics of the media channel filters in effect in an exemplary embodiment in accordance with the present invention. As shown in the illustration, "Dad" has two media channel filters defined. The first is for the time period from 5:00 AM to 7:30 AM, during which he would like access to any media channels carrying financial information in the English language. He has also defined a second filter active from 7:30 PM to 11:00 PM, during which he would like to have access to media channels of a scientific nature presented in the English language. He, acting as the "administrator", has restricted his son to media channels with educational programming on weekdays during the 6:00 AM to 10:00 PM time period. He has, however, allowed his son to access media channels covering sports during the weekends, but only in French, and only for those programs rated "PG-13" or better.

An embodiment of the present invention may be arranged to operate using the most restrictive media channel filter then in effect. Should the active time period of two or more media channel filters overlap, the media channel filter in effect may be arranged to be the most restrictive combination of media channel filters defined at that point in time. The act of changing from one media channel filter to another may require the entry of a user access code, in order to prevent a user with a more restrictive media channel filter from having access to the programming accessible by a user with a less restrictive media channel filter. For example, in the illustration of FIG. 1D, all users of the media processor system would be restricted to accessing media channels with travel content in Spanish and rated "PG/TV-G" or better during the hours of 8:00 AM to 10:00 AM on Saturdays. Entry of the access code for a user with a less restrictive media channel filter may be necessary if a user wished to switch to a media channel of a more mature content or rating.

In another example, the "administrator" (e.g., parent) may define a "Children's Filter" restricting access on the media processing system in an unattended home theater to permit access only to media channels showing cartoons rated "G/TV-G" during the entire day, every day. At those times when a second user wishes to access more mature content, the second user may enter the second user's access code to switch to the second user's less restrictive media channel filter. In order to avoid inappropriate access, an embodiment in accordance with the present invention may periodically request re-entry of the user access code for the more restrictive media channel filter in effect at the time, to insure that the second user has not left without restoring a more restrictive media channel filter also defined in that time period.

Figure 2A:
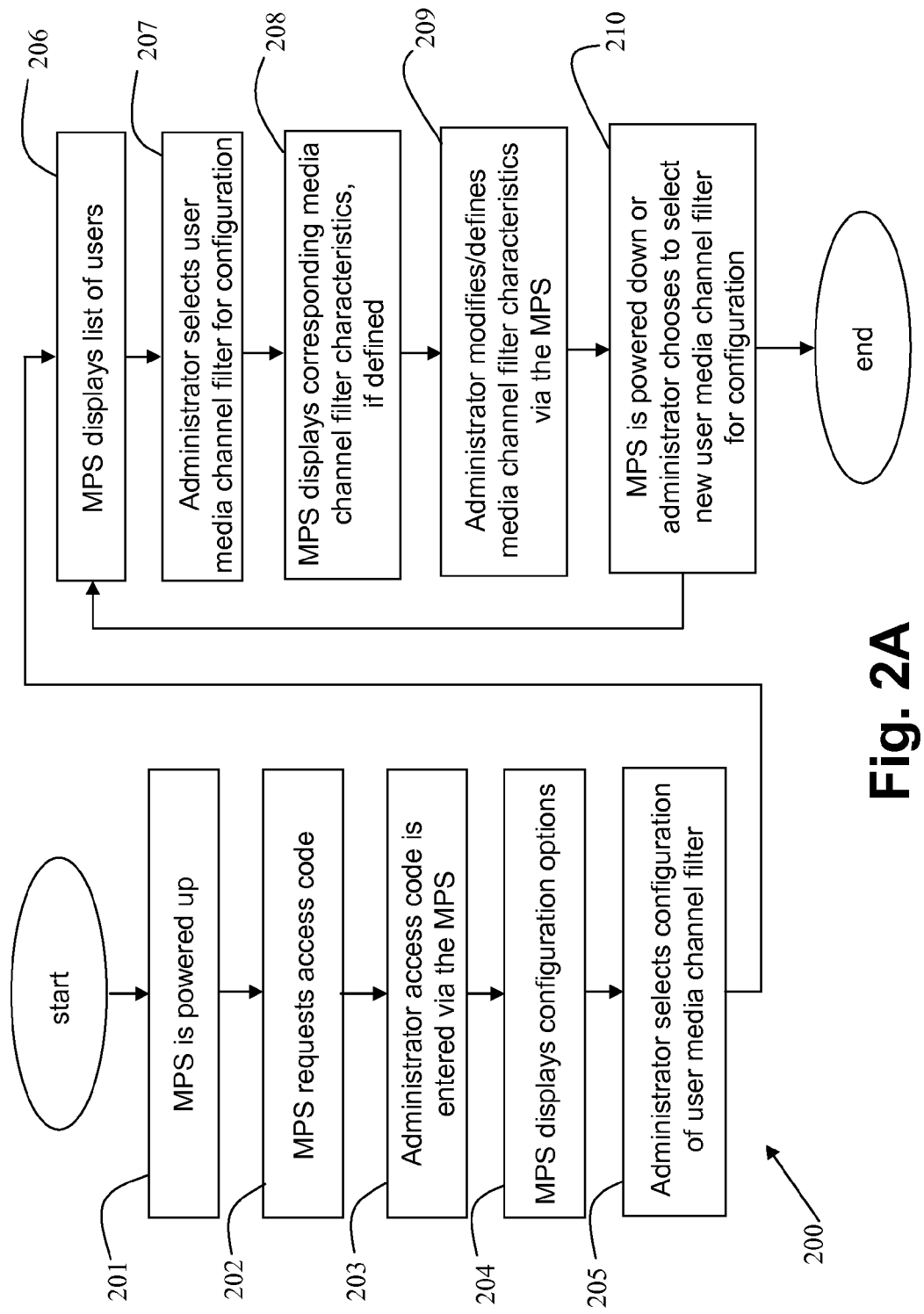
FIG. 2A is a flowchart illustrating an exemplary method of configuring a media channel filter in an embodiment in accordance with the present invention.

FIG. 2A is a flowchart illustrating an exemplary method of configuring a media channel filter in an embodiment in accordance with the present invention. Although the following discussion refers to a MPS such as the MPS 102 of FIG. 1A, FIG. 2A applies equally to a PC, such the PC 104 of FIG. 1A. In the illustration of FIG. 2A, the process of configuring a media channel filter may begin when the user powers up the MPS (step 201). Following power-up, the MPS prompts for the entry of a user access code (step 202). If the user access code entered is that of the administrator of the MPS (step 203), the MPS displays the configuration options available to the administrator (step 204). The administrator may then select the option for configuration of a user media channel filter (step 205).

Next, the MPS displays a list of users known to the MPS (step 206), to allow the administrator to select the user for which the media channel filter is to be configured. The administrator then selects a user media channel filter for examination (step 207). Following the selection, the MPS displays the current media channel filter characteristics for the selected user (step 208). The administrator reviews, and if necessary, updates the media channel filter characteristics in a fashion appropriate for the corresponding user (step 209). The administrator then either chooses to select a new user, or powers down the MPS (step 210).

Figure 2B:
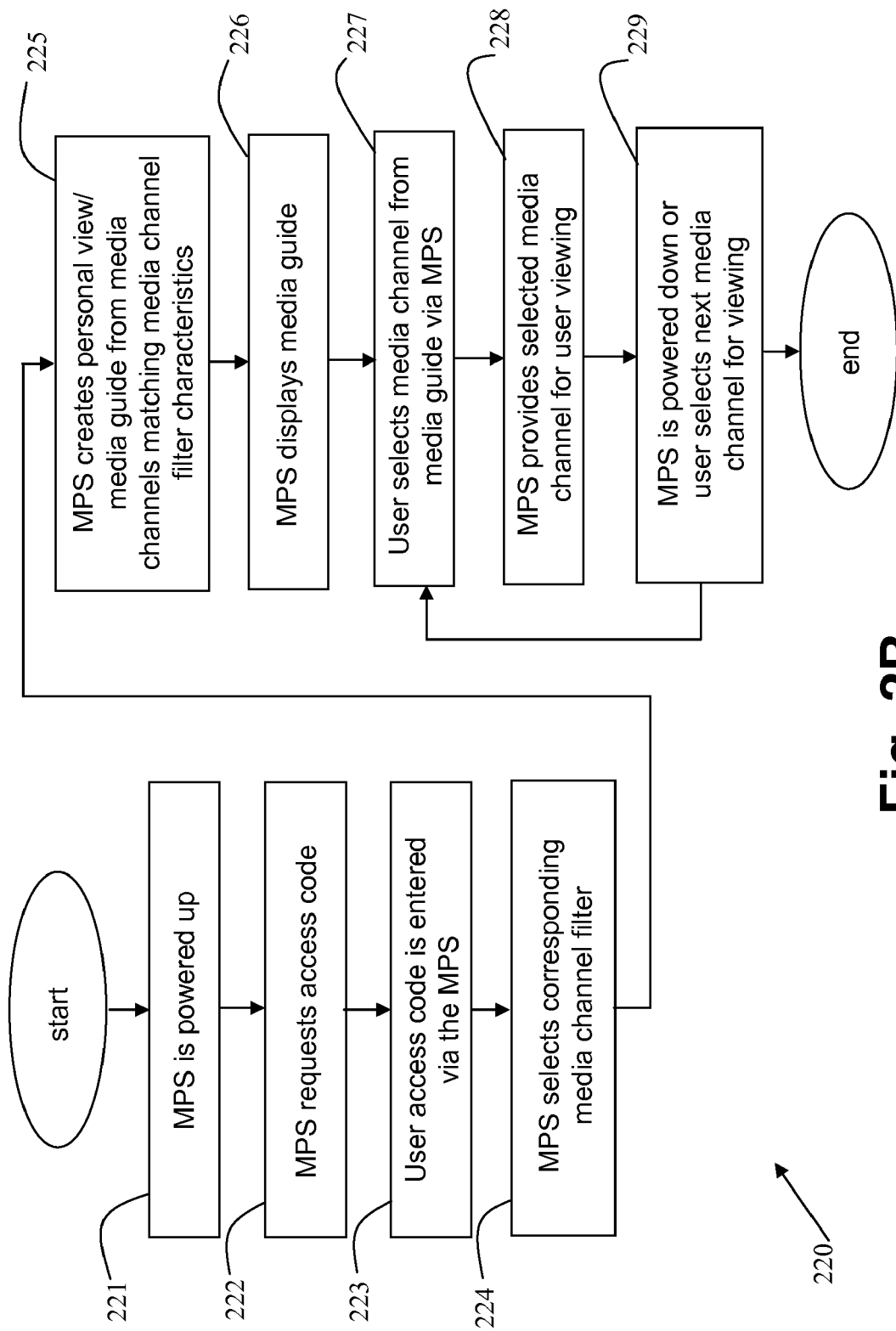
FIG. 2B is a flowchart illustrating an exemplary method of operating a media channel filter in an embodiment in accordance with the present invention.

FIG. 2B is a flowchart illustrating an exemplary method of operating a media channel filter in an embodiment in accordance with the present invention. As in FIG. 2A, the following discussion is made with respect to a MPS, but applies equally to a PC on which the media exchange software platform is running. The operation of a media channel filter begins after the MPS or PC is turned on (step 221). Following power-up, the MPS displays a prompt requesting the entry of a user access code (step 222). The user then enters an access code via the MPS (step 223). If the user access code entered is not the administrator code (see the discussion of FIG. 2A, above), the MPS selects the corresponding media channel filter (step 224) and creates a personal view/media guide listing those currently available media channels that meet the characteristics defined in the media channel filter corresponding to the entered access code (step 225), and displays it for the user (step 226). The user then selects for viewing a media channel from the displayed personal view/media guide (step 227), and the MPS begins providing the selected media channel to the user (step 228). At some later time, the MPS is either powered down, or the user selects a different media channel from their personal view/media guide (step 229).

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
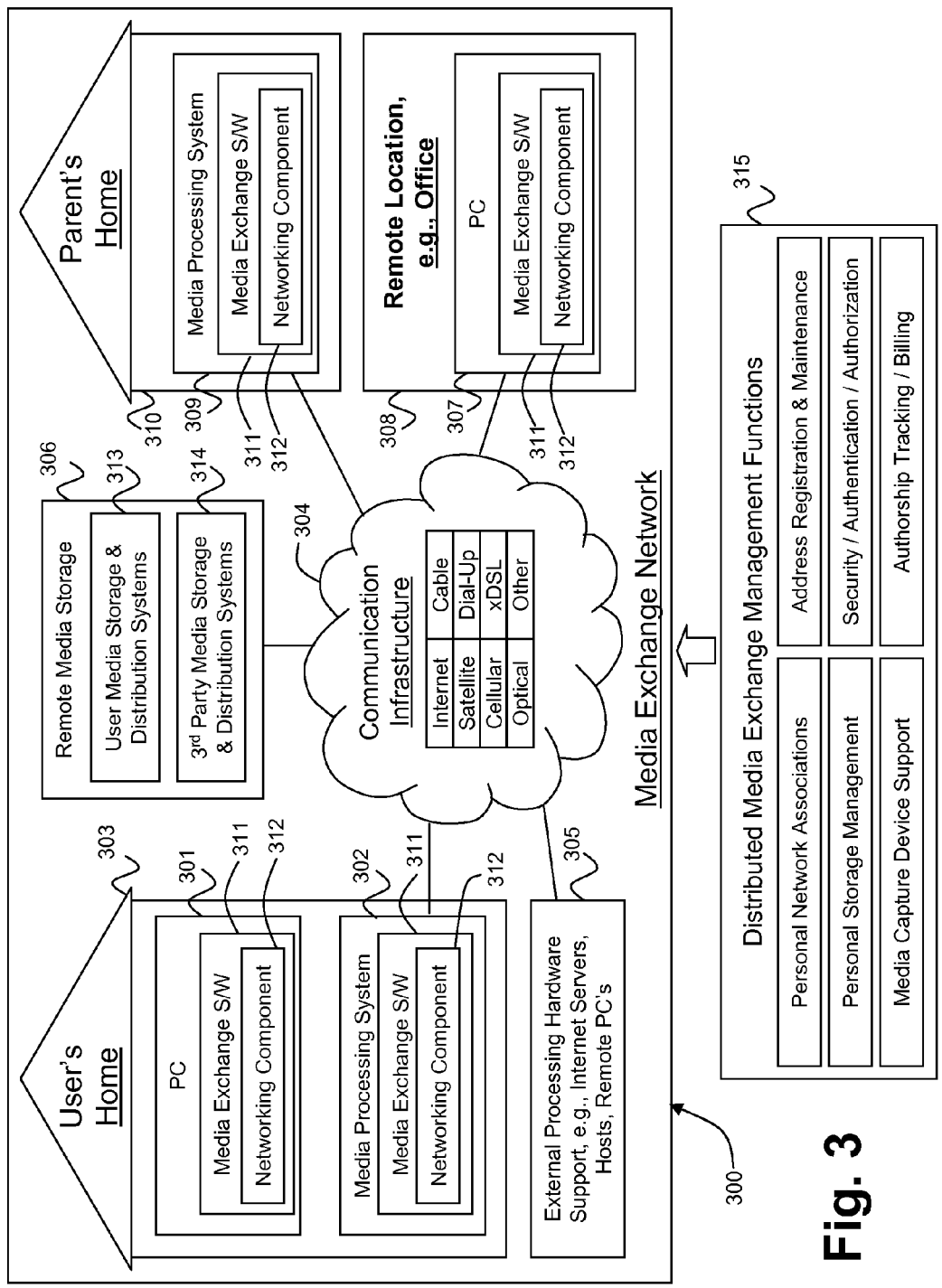
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized Internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
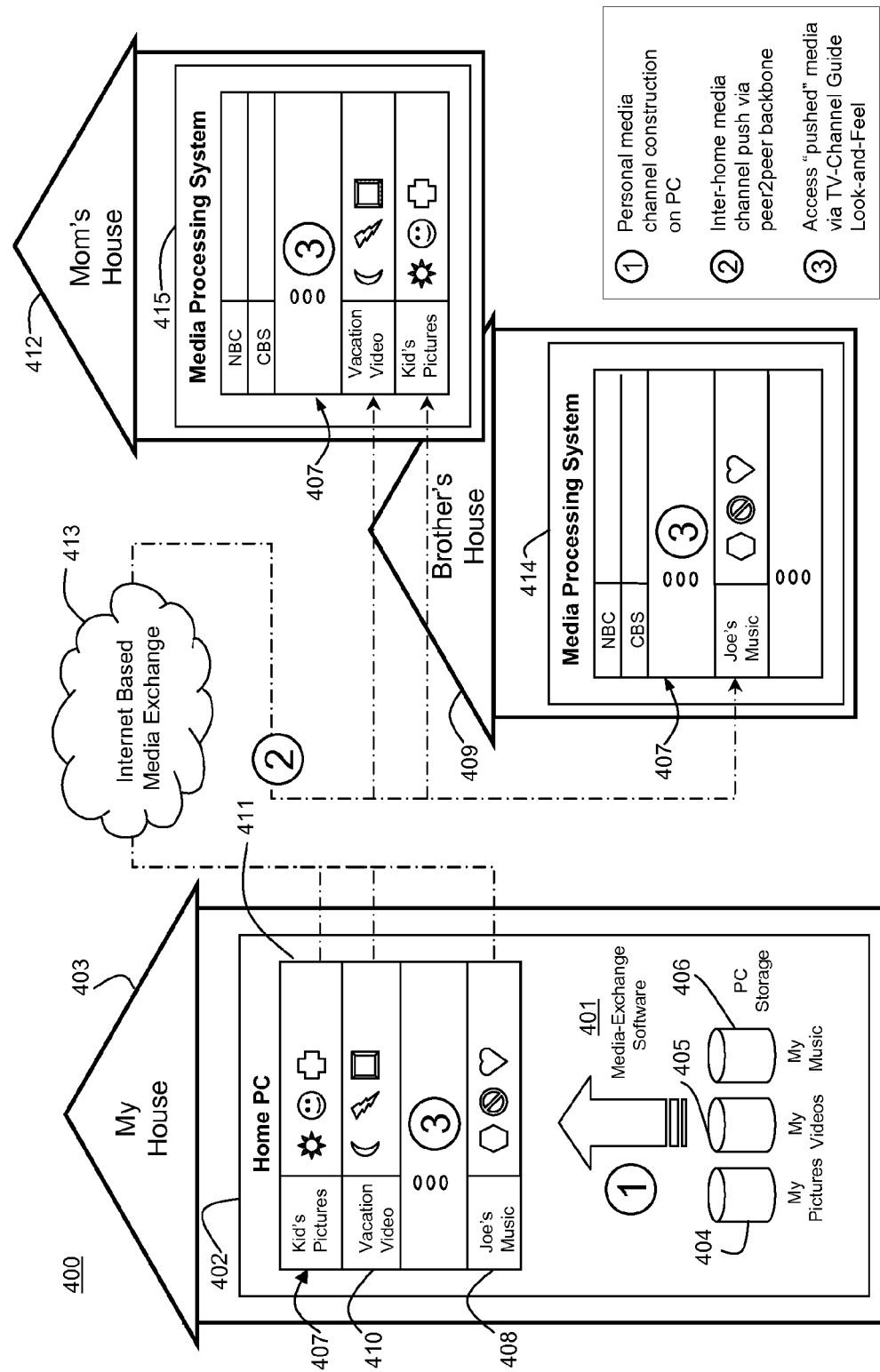
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
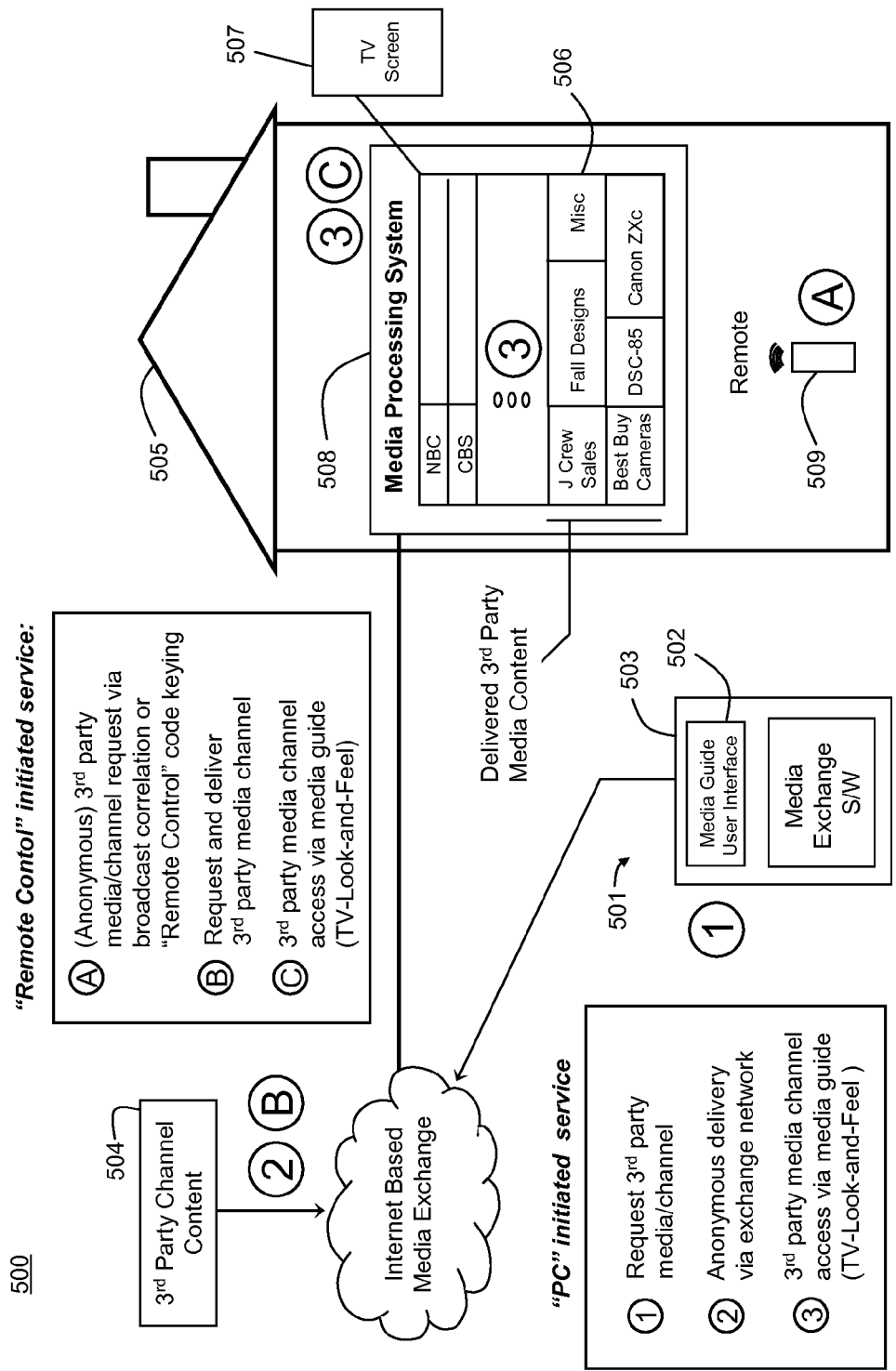
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an Internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
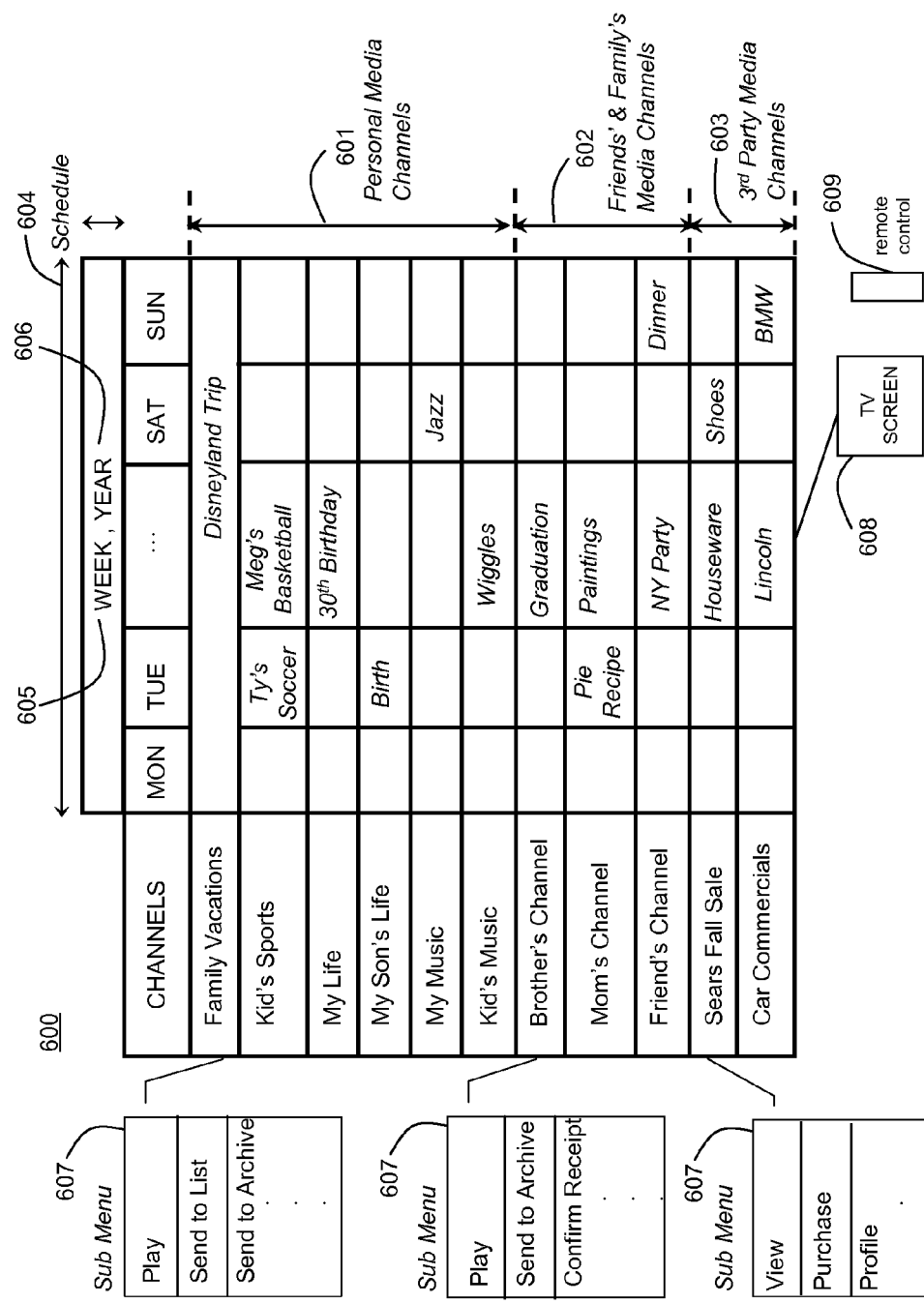
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels, but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
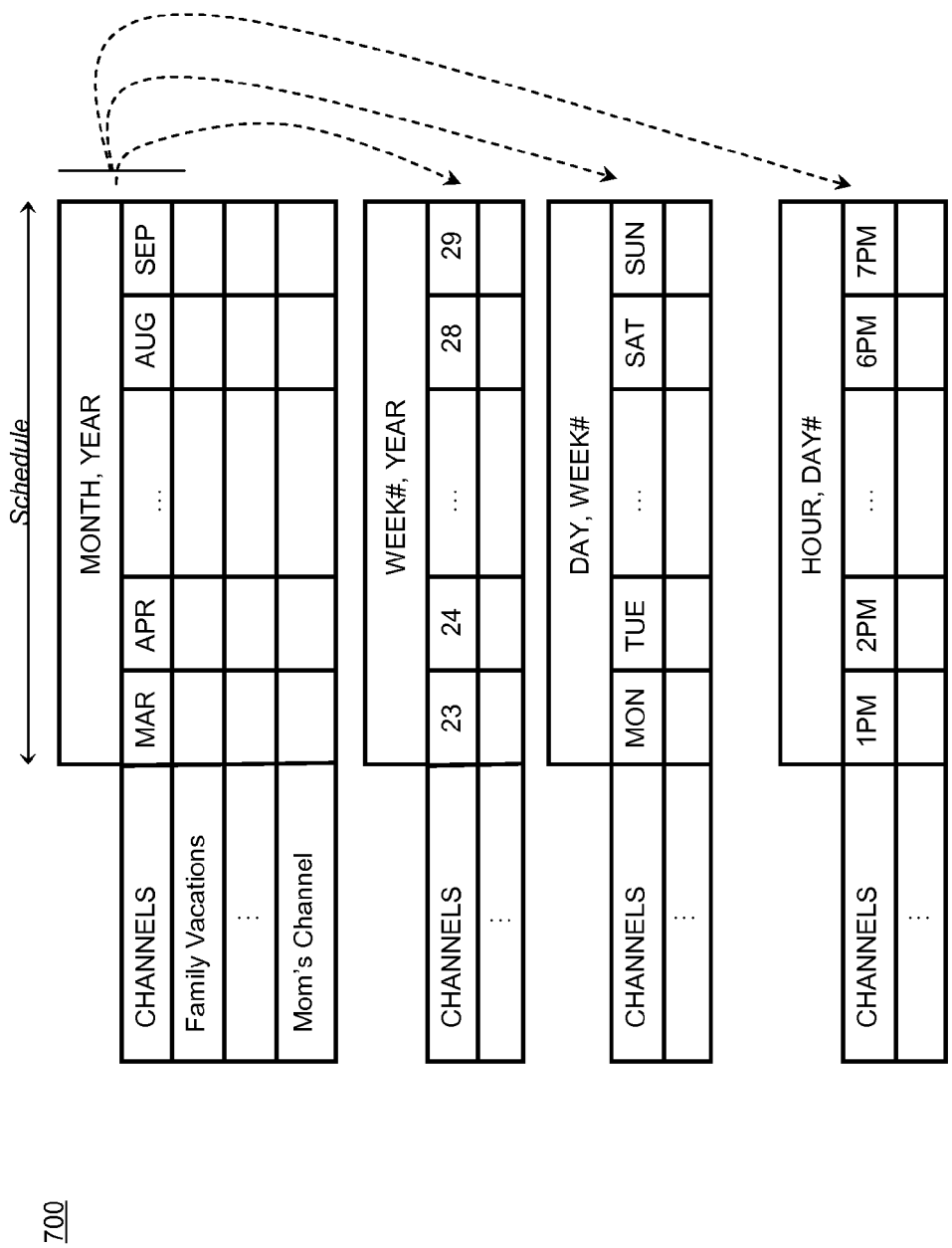
FIG. 7 is an exemplary illustration of several instantiations of a media guide user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
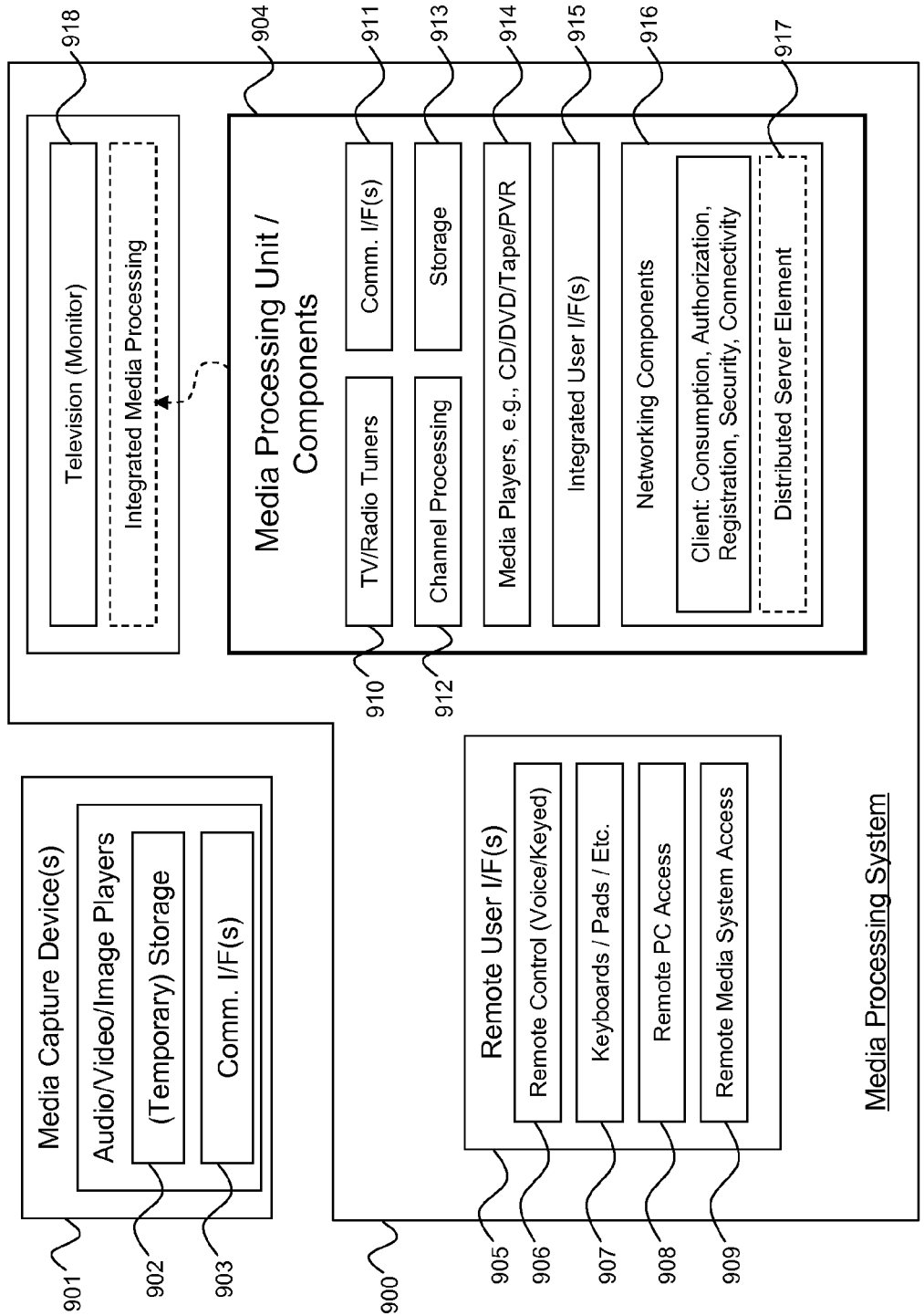
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
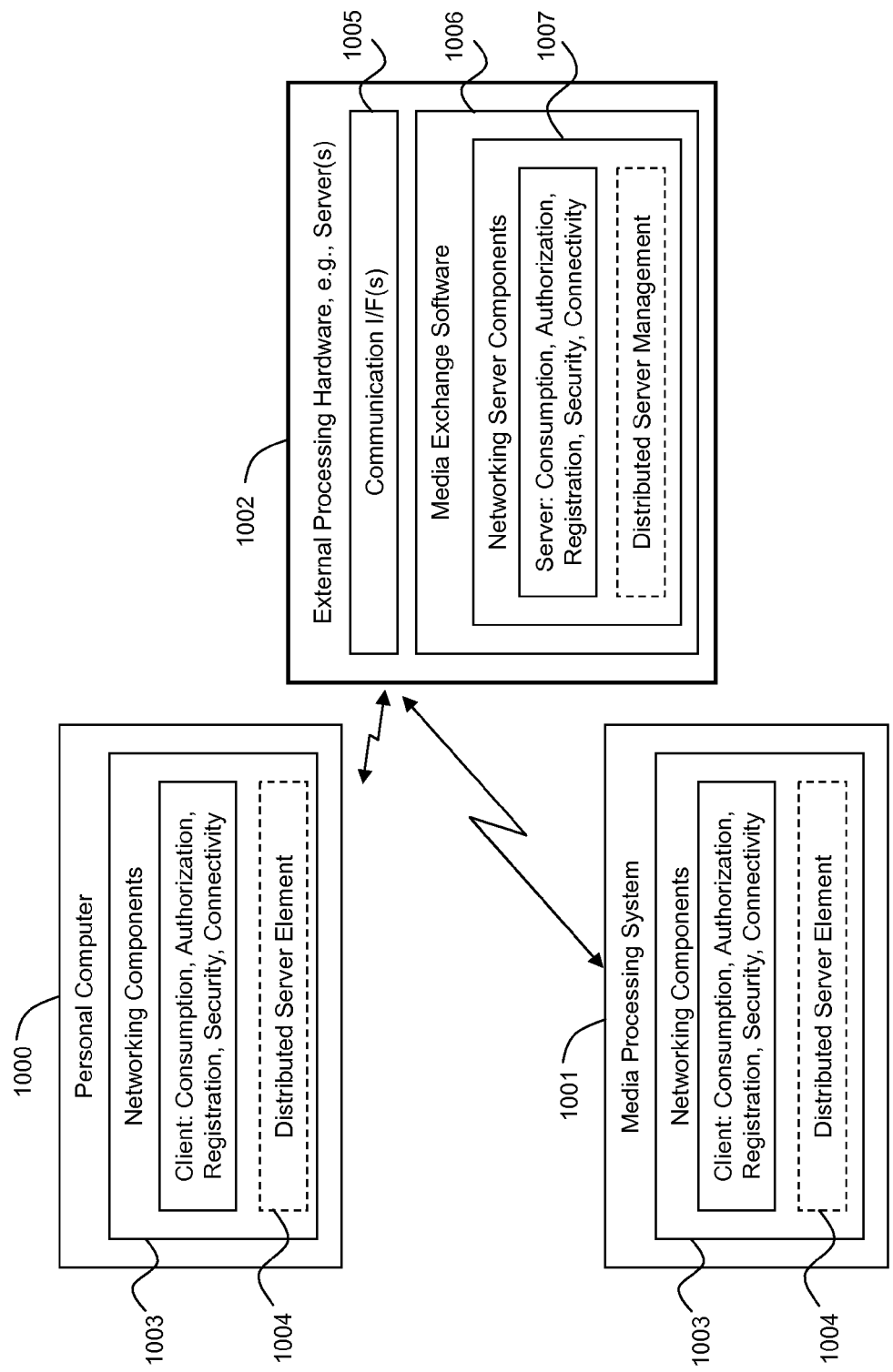
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
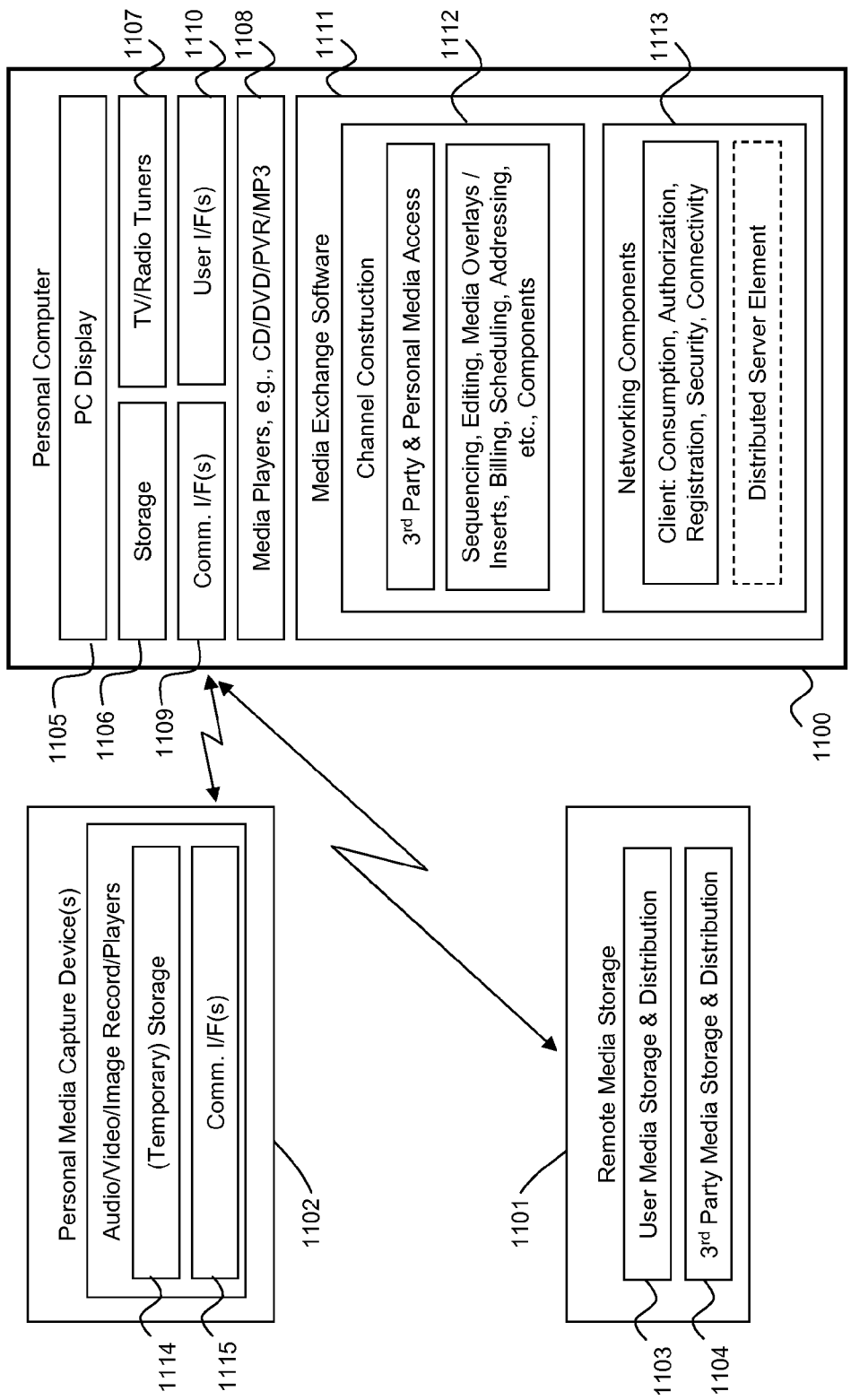
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Various embodiments of the present invention include a system that provide for a media exchange network supporting varying media guides based on viewing filters.

Aspects of the present invention may be seen in a system supporting user defined filtering of media consumption in a media exchange network. Such an embodiment may comprise a television display supporting consumption of media via a communication network, a storage for storing media, and a user interface for display on the television display. The storage may be communicatively coupled to the television display, and may have an associated first network address.

The user interface may have at least one view comprising a collection of media channels, and each media channel in the collection of media channels may comprise a sequence of media available to a first user. The display and consumption of each media channel may be subject to at least one media filter, and the at least one media filter may comprise characteristics of media defined by a second user. Such an embodiment may also comprise at least one server supporting the consumption of media, and server software that receives via the communication network a request identifying one of the associated first and second network addresses. The at least one server may have an associated second network address, and may respond by identifying the other of the associated first and second network addresses to coordinate the consumption of media.

In an embodiment in accordance with the present invention, the media may comprise at least one of audio, a still image, video, real time video, and data. The first and second network addresses may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet. In an embodiment of the present invention, consumption may comprise at least one of playing digitized audio, displaying a still image, displaying video, and displaying data. The characteristics of media may comprise at least one of a type of media channel, a language of dialogue, an industry rating, a overall viewer rating, a mode, a video quality, a format, a bandwidth, a year of release, an artist, and one or more words of a title. The at least one media filter may support combinations of the characteristics of media using Boolean relations, and at least one period of time for which the at least one media filter is effective may be defined by at least one of the first user and the second user. The at least one media filter may be at least one of enabled, disabled, created, deleted, and modified via the communication network. An embodiment in accordance with the present invention may also comprise a remote control supporting the selection of media for consumption, and the media available for selection using the remote control may be determined according to the at least one media filter. The first user and second user may be the same user.

Additional aspects of the present invention may be found in a system supporting user defined filtering of media consumption in a media exchange network. An embodiment of such a system may comprise a television display, a storage for storing media, and a user interface comprising a collection of media channels. The storage may be communicatively coupled to the television display, and each media channel in the collection of media channels may comprise a sequence of media available to a first user. The display and consumption of each media channel may be subject to at least one media filter, and the at least one media filter may comprise characteristics of media defined by a second user. An embodiment of the present invention may also comprise at least one server communicatively coupled to the storage, and server software that receives a request via a communication network, and responds by coordinating the consumption of media by the television display. The media may comprise at least one of audio, a still image, video, real time video, and data. The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet.

In an embodiment in accordance with the present invention, consumption may comprise at least one of playing digitized audio, displaying a still image, displaying video, and displaying data. The characteristics of media may comprise at least one of a type of media channel, a language of dialogue, an industry rating, a overall viewer rating, a mode, a video quality, a format, a bandwidth, a year of release, an artist, and one or more words of a title, and the at least one media filter may support combinations of the characteristics of media using Boolean relations. At least one period of time for which the at least one media filter is effective may be defined by at least one of the first user and the second user, in an embodiment of the present invention. In addition, the at least one media filter may be at least one of enabled, disabled, created, deleted, and modified via the communication network. An embodiment of the present invention may also comprise a remote control supporting the selection of media for consumption, and the media available for selection using the remote control may be determined according to the at least one media filter. In addition, the first user and second user may be the same user.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system supporting user defined filtering of media consumption in a media exchange network, the system comprising:
 at least one processor for operably coupling to a display device that supports consumption of media and to a communication network;
 wherein the at least one processor controls display of a user interface on the display device, the user interface having at least one view comprising a collection of media channels, each media channel in the collection comprising a sequence of media content available to a first user, the display of each media channel in the at least one view subject to at least one media channel filter comprising media channel characteristics defined by a second user; and
 wherein the at least one processor limits media consumption to media content of the collection of media channels.

2. The system of claim 1, wherein the media content comprises one or more of audio, a still image, video, real time video, and/or data.

3. The system of claim 1, wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

4. The system of claim 3, wherein the communication network comprises the Internet.

5. The system of claim 1, wherein consumption comprises one or more of playing digitized audio, displaying a still image, displaying video, and/or displaying data.

6. The system of claim 1, wherein the media channel characteristics comprise one or more of a type of media channel, a language of dialogue, an industry rating, an overall viewer rating, a mode, a video quality, a format, a bandwidth, a year of release, an artist, and/or one or more words of a title.

7. The system of claim 1, wherein the at least one media channel filter supports combinations of the media channel characteristics using Boolean relations.

8. The system of claim 1, wherein at least one period of time for which the at least one media channel filter is effective is defined by at least one of the first user and the second user.

9. The system of claim 1, wherein the at least one media channel filter may be one or more of enabled, disabled, created, deleted, and/or modified via the communication network.

10. The system of claim 1, comprising:
circuitry for interfacing to a remote control supporting the selection of a media channel for consumption of media content; and
the media channel available for selection using the remote control being determined according to the at least one media channel filter.

11. The system of claim 1, wherein the first user and second user are the same user.

12. The system of claim 1, wherein the at least one media channel filter comprises two or more media channel filters, each for a corresponding user.

13. The system of claim 12, wherein the at least one view comprises a collection of media channels according to the most restrictive media channel filter of the two or more media channel filters.

14. The system of claim 1, wherein the at least one media channel filter is selected according to an access code of the first user.

15. The system of claim 1, wherein one or more of the media channels comprises a user selected and time scheduled sequence of media content.

16. A method for operating a device supporting user defined filtering of media consumption in a media exchange network, the method comprising:
operably coupling to a display device that supports consumption of media and to a communication network;
controlling display of a user interface on the display device, the user interface having at least one view comprising a collection of media channels, each media channel in the collection comprising a sequence of media content available to a first user, the display of each media channel in the at least one view subject to at least one media channel filter comprising media channel characteristics defined by a second user; and
limiting media consumption to media content of the collection of media channels.

17. The method of claim 16, wherein the media content comprises one or more of audio, a still image, video, real time video, and/or data.

18. The method of claim 16, wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

19. The method of claim 18, wherein the communication network comprises the Internet.

20. The method of claim 16, wherein consumption comprises one or more of playing digitized audio, displaying a still image, displaying video, and/or displaying data.

21. The method of claim 16, wherein the media channel characteristics comprise one or more of a type of media channel, a language of dialogue, an industry rating, an overall viewer rating, a mode, a video quality, a format, a bandwidth, a year of release, an artist, and/or one or more words of a title.

22. The method of claim 16, wherein the at least one media channel filter supports combinations of the media channel characteristics using Boolean relations.

23. The method of claim 16, wherein at least one period of time for which the at least one media channel filter is effective is defined by at least one of the first user and the second user.

24. The method of claim 16, wherein the at least one media channel filter may be one or more of enabled, disabled, created, deleted, and/or modified via the communication network.

25. The method of claim 16, wherein the method comprises:
interfacing to a remote control supporting the selection of a media channel for consumption of media content; and
determining whether the media channel is available for selection using the remote control, according to the at least one media channel filter.

26. The method of claim 16, wherein the first user and second user are the same user.

27. The method of claim 16, wherein the at least one media channel filter comprises two or more media channel filters, each for a corresponding user.

28. The method of claim 27, wherein the at least one view comprises a collection of media channels according to the most restrictive media channel filter of the two or more media channel filters.

29. The method of claim 16, wherein the at least one media channel filter is selected according to an access code of the first user.

30. The method of claim 16, wherein one or more of the media channels comprises a user selected and time scheduled sequence of media content.

31. A non-transitory computer-readable medium having stored thereon a plurality of code sections, each code section comprising a plurality of instructions executable by a processor to cause the processor to perform a method for operating a device supporting user defined filtering of media consumption in a media exchange network, the method comprising:
operably coupling to a display device that supports consumption of media and to a communication network;
controlling display of a user interface on the display device, the user interface having at least one view comprising a collection of media channels, each media channel in the collection comprising a sequence of media content available to a first user, the display of each media channel in the at least one view subject to at least one media channel filter comprising media channel characteristics defined by a second user; and
limiting media consumption to media content of the collection of media channels.

32. The non-transitory computer-readable medium of claim 31, wherein the media content comprises one or more of audio, a still image, video, real time video, and/or data.

33. The non-transitory computer-readable medium of claim 31, wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

34. The non-transitory computer-readable medium of claim 33, wherein the communication network comprises the Internet.

35. The non-transitory computer-readable medium of claim 31, wherein consumption comprises one or more of playing digitized audio, displaying a still image, displaying video, and/or displaying data.

36. The non-transitory computer-readable medium of claim 31, wherein the media channel characteristics comprise one or more of a type of media channel, a language of dialogue, an industry rating, an overall viewer rating, a mode, a video quality, a format, a bandwidth, a year of release, an artist, and/or one or more words of a title.

37. The non-transitory computer-readable medium of claim 31, wherein the at least one media channel filter supports combinations of the media channel characteristics using Boolean relations.

38. The non-transitory computer-readable medium of claim 31, wherein at least one period of time for which the at least one media channel filter is effective is defined by at least one of the first user and the second user.

39. The non-transitory computer-readable medium of claim 31, wherein the at least one media channel filter may be one or more of enabled, disabled, created, deleted, and/or modified via the communication network.

40. The non-transitory computer-readable medium of claim 31, wherein the method comprises:

interfacing to a remote control supporting the selection of a media channel for consumption of media content; and
   determining whether the media channel is available for selection using the remote control, according to the at least one media channel filter.

41. The non-transitory computer-readable medium of claim 31, wherein the first user and second user are the same user.

42. The non-transitory computer-readable medium of claim 31, wherein the at least one media channel filter comprises two or more media channel filters, each for a corresponding user.

43. The non-transitory computer-readable medium of claim 42, wherein the at least one view comprises a collection of media channels according to the most restrictive media channel filter of the two or more media channel filters.

44. The non-transitory computer-readable medium of claim 31, wherein the at least one media channel filter is selected according to an access code of the first user.

45. The non-transitory computer-readable medium of claim 31, wherein one or more of the media channels comprises a user selected and time scheduled sequence of media content.

* * * * *